United States Patent [19]

Matsui et al.

[11] Patent Number: 5,204,153

[45] Date of Patent: Apr. 20, 1993

[54] WRITE ONCE READ MANY TYPE OPTICAL DISC

[75] Inventors: Fumio Matsui; Makoto Okano; Tatsuro Sakai; Satoru Tanaka; Shuichi Yanagisawa, all of Saitama, Japan

[73] Assignee: Pioneer Electronic Corporation, Tokyo, Japan

[21] Appl. No.: 862,312

[22] Filed: Apr. 2, 1992

[30] Foreign Application Priority Data

Aug. 13, 1991 [JP] Japan .................................. 3-202949

[51] Int. Cl.$^5$ .............................................. B32B 3/00
[52] U.S. Cl. ...................................... 428/64; 428/65; 428/457; 428/913; 430/945; 346/76 L; 346/135.1
[58] Field of Search ................. 428/64, 65, 195, 411.1, 428/457, 913; 430/945; 346/76 L, 135.1

[56] References Cited

U.S. PATENT DOCUMENTS 4,752,554  6/1988  Sato et al. ............................ 430/273
4,839,883  6/1989  Nagata et al. ........................ 369/286

Primary Examiner—Patrick J. Ryan
Assistant Examiner—Elizabeth Evans
Attorney, Agent, or Firm—Sughrue, Mion, Zinn, Macpeak & Seas

[57] ABSTRACT

A write once read many type optical disc comprises a light transmissive substrate having a tracking groove formed therein, a light absorbing layer disposed on a surface of the substrate on which the tracking groove is formed, and a light reflection layer disposed on the light absorbing layer, wherein an RMI value defined by the following formula is not lower than 0.22: RMI value=-$(I_l-I_g)I_o$, wherein $I_l$ denotes an electric potential at a land portion, $I_g$ denotes an electric potential at a groove portion, and $I_o$ denotes an electric potential at a mirror surface portion.

When the write once read many type optical disc is caused to have a structure as described above, there may be provided the write once read many type optical disc having a good playability, i.e., the optical disc wherein the TE level may be provided assuredly on the basis of a value obtained from one beam.

7 Claims, 3 Drawing Sheets

RECORDING LIGHT OR REPRODUCING LIGHT

WRITE ONCE READ MANY TYPE OPTICAL DISC

FIELD OF THE INVENTION

The present invention relates to a writable addition type optical disc, more specifically to a write once read many type optical disc which is capable of being reproduced by means of a so-called ordinary "CD (compact disc) player".

BACKGROUND OF THE INVENTION

Recently, there has actively been developed a writable write once read many (hereinafter, referred to as "WORM") type optical disc which is capable of being reproduced by means of an ordinary CD player with reference to standards called as "Orange Book" and "Red Book". In these standards, with respect to a tracking error signal (hereinafter, referred to as "TE") to be used for the above WORM type optical disc, only a data standard for a push-pull method using one beam is present.

In the CD players used as present, however, the TE control is mainly effected by use of a so-called "three-beams method", or "time difference method" using one beam. Accordingly, some optical discs only have a poor playability. More specifically, some discs can assuredly provide the TE based on the push-pull method but little provide the TE based on the three-beams method. Such cases inevitably cause a confusion in the user side, and therefore it is desired to adopt an active measure for avoiding such a confusion.

In order to need the above requirement, it is conceivable to adopt a method wherein a TE based on the three-beams method is defined. In the three-beams method, however, the TE based on the three-beams method cannot be specified because (1) the angle $\theta$ formed between a line connecting two subordinate beams and the track has been designed in various manners, (2) if the trace of the movement of a pick up is not provided precisely, the above angle $\theta$ may be changed during the movement, etc.

SUMMARY OF THE INVENTION

An object of the present invention is, in view of the above problems encountered in the prior art, to provide a WORM type optical disc having a good playability, i.e., a WORM type optical disc which is capable of observing the TE level for the three-beams method on the basis of the value obtained from one beam and the TE can assuredly be provided by use of one beam.

For the purpose of solving the above problems, there is provided a WORM type optical disc, comprising a light transmissive substrate having a tracking groove formed therein, a light absorbing layer disposed on a surface of the substrate on which the tracking groove is formed, and a light reflection layer disposed on the light absorbing layer, wherein an RMI value defined by the following formula is not lower than 0.22:

$$RMI\ value = (I_l - I_g)/I_o,$$

wherein $I_l$ denotes an electric potential at a land portion, $I_g$ denotes an electric potential at a groove portion, and $I_o$ denotes an electric potential at a mirror surface portion.

According to the present invention, the TE level for the three-beams method may be observed by use of a value based on the measurement using one beam, and there may be provided the WORM type optical disc having a good playability, i.e., the WORM type optical disc which is capable of providing the TE by use of one beam.

These and other objects, features and advantages of the present invention will become more apparent upon a consideration of the following description of the preferred embodiments of the present invention taken in conjunction with the accompanying drawings.

DESCRIPTION OF PREFERRED EMBODIMENTS

Figure 1:
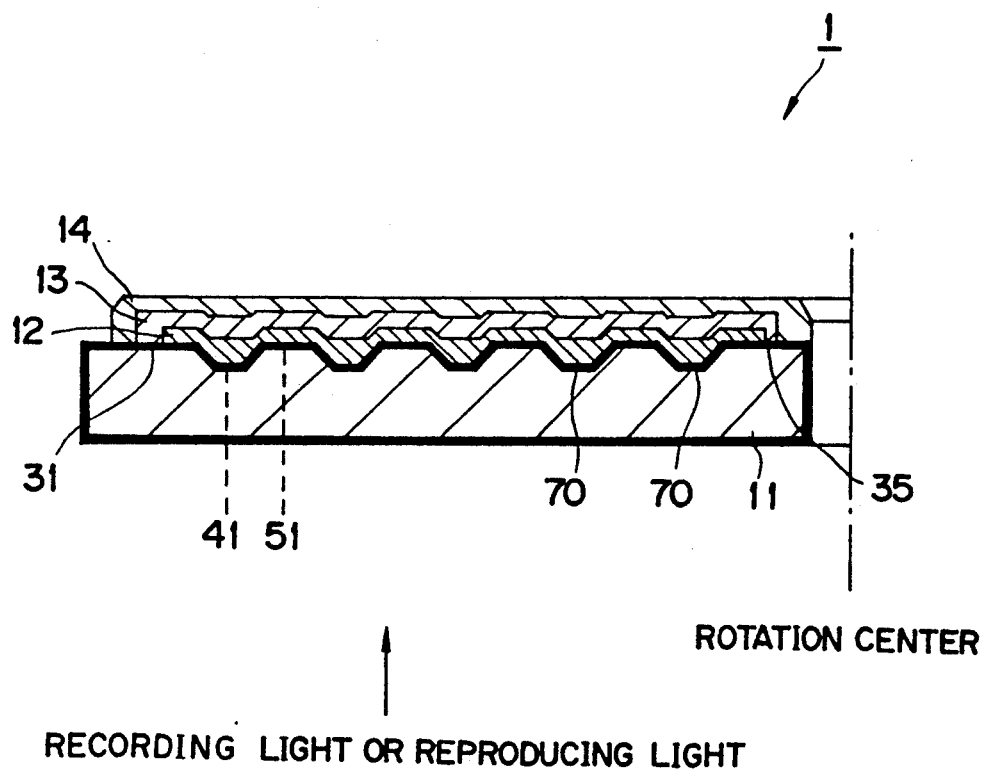
FIG. 1 is a schematic sectional view for illustrating the structure of a WORM type optical disc according to an embodiment of the present invention.

FIG. 1 is a schematic sectional view for illustrating the structure of a WORM type optical disc according to an embodiment of the present invention.

FIG. 1 shows a section of the disc on the left side with respect to the rotation center thereof, for the sake of simplicity.

The WORM type optical recording medium 1 according to the present invention comprises a substrate a light absorbing layer 12 disposed on the substrate a light reflection or optical reflection) layer 13 disposed on the light absorbing layer 12, and a protection layer 14 disposed on the light reflection layer 13.

On one surface side of the light transmissive substrate 11, there is formed a pre-groove 70 in the form of a concentric circle or in a spiral form for effecting tracking. In view of an improvement in the productivity of the substrate 11 having such a pre-groove, it is preferred to use a so-called injection molded resin substrate (integrally molded resin substrate as the substrate 11. Such a substrate may for example be formed by use of a transparent resin such as a polycarbonate resin (PC). and a polymethylmethacrylate resin (PMMA). In addition, the substrate 11 is not only restricted to the above integrally molded substrate produced by the injection molding but also is a substrate formed by use of a so-called 2P (photopolymer) process.

Such a substrate 11 may preferably have a thickness of about 1.0 to 1.5 mm.

On such a substrate 11, the light absorbing layer 12 is disposed. The light absorbing layer 12 comprises a cyanine type coloring matter (or colorant), as a composition (or component to be used for recording. For Example, the cyanine coloring matter may preferably be one represented by the following general formula [I]:

General formula [I]

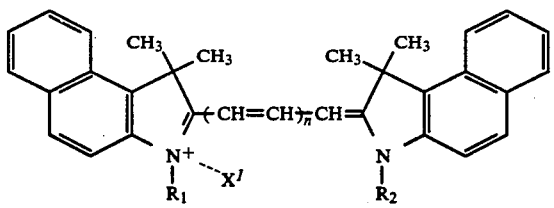

In the above general formula [I], $R_1$ and $R_2$ respectively denote an alkyl group having 1 to 6 carbon atoms (more preferably, an alkyl group having 1 to 4 carbon atoms); X denotes a counter ion (more specifically, an ion such as $ClO_4^-$, $I^-$, and $Br^-$): and n denotes an integer of 2 or 3 (more preferably an integer of 2).

The light absorbing layer 12 comprising such a cyanine coloring matter may for example be formed by an ordinary coating method such as spin coating method. As shown in FIG. 1, such a light absorbing layer 12 may preferably be formed so that an inner peripheral portion and an outer peripheral portion of the substrate 11 are not covered with the light absorbing layer 12. The light absorbing layer 12 may preferably have a thickness of 30 to 900 nm, more preferably to 300 nm. If the thickness is below 30 nm, the amount or quantity of light absorbed by the light absorbing layer 12 is considerably decreased so that the sensitivity in a wavelength region corresponding to a semiconductor laser is decreased. As a result, there is posed a problem such that it is difficult to record a signal. On the other hand, the above thickness is above 900 nm, the thickness of the coloring matter recording layer (or the light absorbing layer) becomes too large so that the quantity of light absorbed by the light absorbing layer becomes too large. As a result, there is posed a problem such that the reflectivity or reflection efficiency) is decreased. In the above coating operation for the light absorbing layer 12, it is possible to use a known solvent. Specific examples thereof may include: diacetone alcohol, ethyl cellosolve, methyl cellosolve, isophorone, methanol, tetrafluoropropanol, dichloroethane, etc..

In addition, it is preferred to incorporate a quencher in the light absorbing layer 12 in view of the prevention of photo-deterioration or deterioration by light of the cyanine type coloring matter contained.

On the above light absorbing layer 12, the light reflection layer 13 may be formed. The light reflection layer 13 may comprise a metal such as Au, Ag, Cu, and Al. Such a light reflection layer 13 may preferably be formed by use of one selected from various vacuum film forming (or vacuum vapor deposition) processes such as vacuum evaporation, sputtering, and ion plating. Such a light reflection layer 13 may preferably be formed so that it covers (or envelops) the upper surface and the end (or side) surface of the above light absorbing layer 12. Since the light reflection layer 13 is formed so that it covers the end surface of the light absorbing layer 12, a mirror surface portion (or mirror mark) 31, 35 in the form of a ring (or rings) in which the light reflection layer 13 is directly contacted to the substrate 11. The thus formed light reflection layer 13 may preferably have a thickness of about 0.02 to 2.0 μm.

In the WORM type optical recording disc having the structure as described above, since the pre-groove 70 is formed in the substrate 11, there are present so-called a groove portion 41 and a land portion 51 corresponding to the presence or absence of the pre-groove 70 provided therein. The WORM type optical disc according to the present invention, is designed so as to provide an RMI value represented by the following formula of 0.22 or larger, more preferably 0.22 to 0.50:

$RMI\ value = (I_l - I_g)/I_o,$ wherein the $I_l$ denotes an electric potential at the land portion (i.e., a value obtained by converting the quantity of reflection light at the land portion into an electric potential), the $I_g$ denotes an electric potential at the groove portion (i.e., a value obtained by converting the quantity of reflection light at the groove portion into an electric potential), and the $I_o$ denotes an electric potential at the mirror surface portion or mirror mark (i.e., a value obtained by converting the quantity of reflection light at the mirror surface portion into an electric potential . The RMI value may be measured by use of one beam and has a mathematic correlation with the TE value used in the three-beams method, as described hereinafter. When the RMI value is below 0.22, a so-called playability becomes unstable and therefore there is posed a problem such that the tracking error signal is not detected assuredly. As the parameter regulating (or controlling) the RMI value on the basis of the structure of the disc, there may be enumerated, the depth of the groove, the width of the groove, the configuration of the groove, the thickness of the light absorbing layer, the optical constant, the configuration of the interface or boundary between the light absorbing layer and light reflection layer, the material of the substrate, etc.

Figure 2:
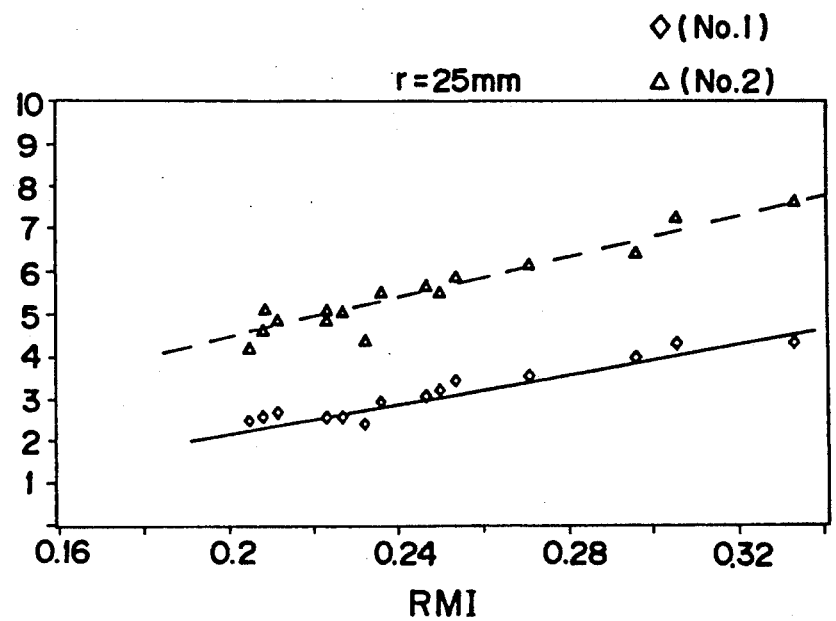
FIG. 2 is a graph showing a relationship between the RMI value and the TE for the three-beams method at the position of the disc radius r=25 mm.
Figure 3:
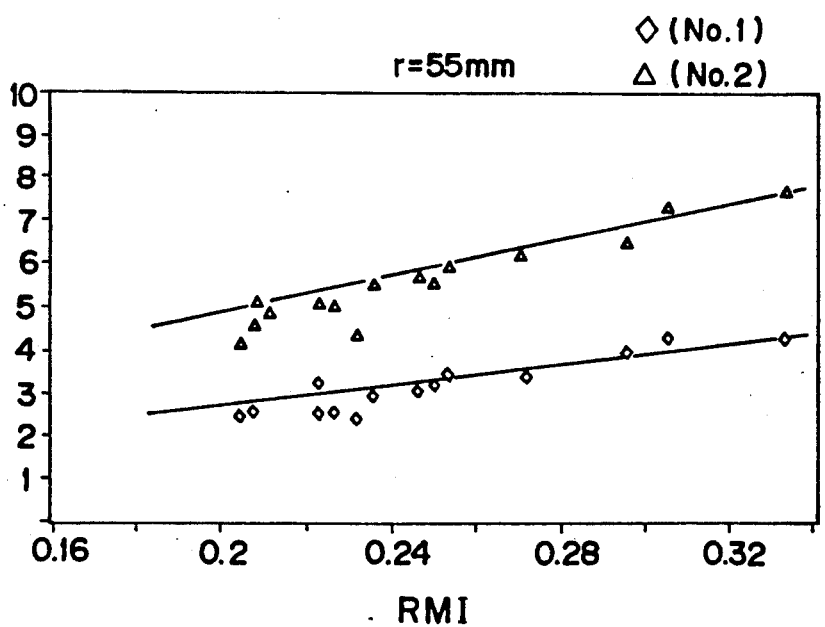
FIG. 3 is a graph showing a relationship between the RMI value nd the TE for the three-beams method at the position of the disc radius r=55 mm.
Figure 4:
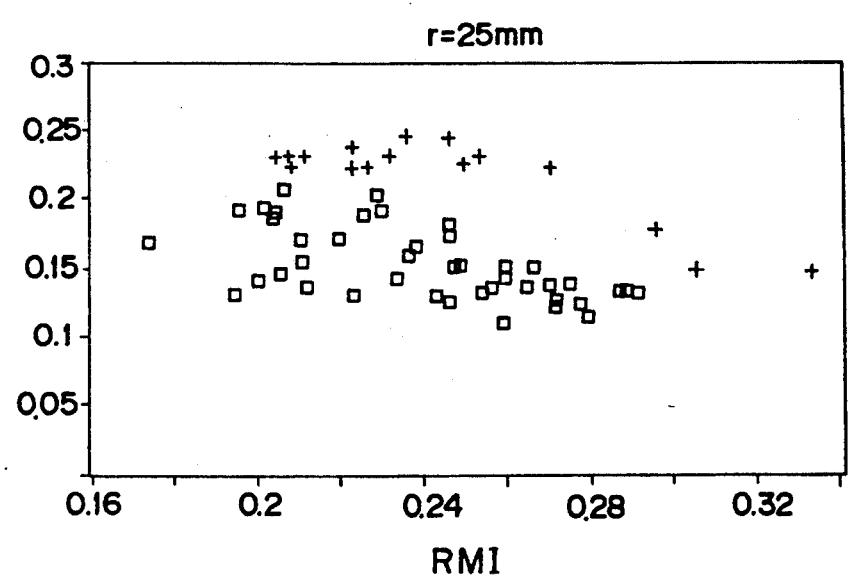
FIG. 4 is a graph showing a relationship between the RMI value and the TE for the push-pull method at the position of the disc r=25 mm.
Figure 5:
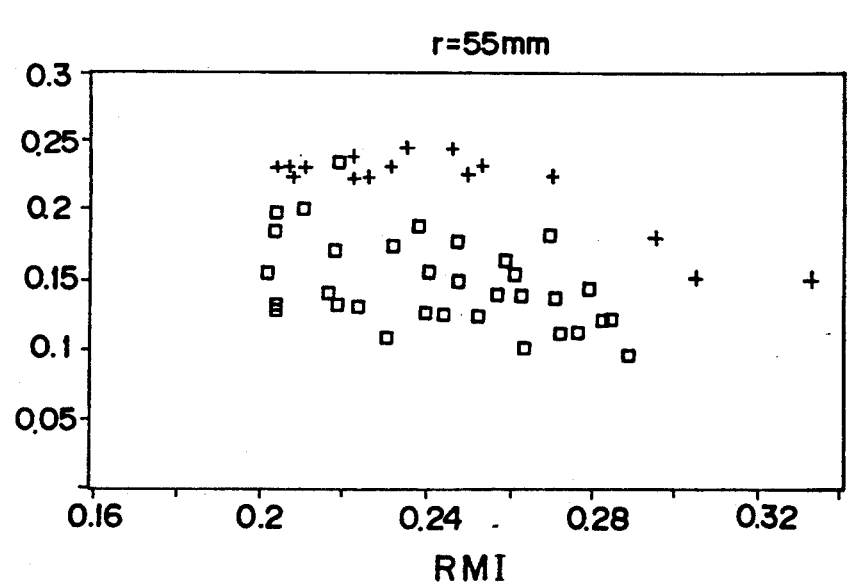
FIG. 5 is a graph showing a relationship between the RMI value and the TE for the push-pull method at the position of the disc radius r=55 mm.

It has been confirmed that the RMI value mathematically relates to the TE value used in the three-beams method as described above. FIGS. 2 and 3 are graphs each showing (or proving) such a relationship. FIGS. 2 and 3 show a relationship between the RMI value and the TE value (unit: volt in the three-beams method at a position where the disc radius is r=25 mm, and r=55 mm, respectively. In these drawings, discs having various specifications are subjected to a measurement by use of CD player of two species (No. 1 and No. 2). Since the CD players have different θ values corresponding to the three-beams, these drawings show two lines having two different inclinations. FIGS. 4 and 5 show a relationship between the RMI value and the TE value (unit: volt) in the push-pull method at a position where the disc radius is r=25 mm, and r=55 mm, respectively. These drawings suggest that the RMI value does not mathematically relate to the TE value in the push-pull method, and further suggest that the TE value in the three-beams method does not mathematically relate to the TE value in the push-pull method.

As shown in FIG. the protection layer 14 may generally be disposed on the light reflection layer 13 for the purpose of protecting the light absorbing layer 12 and the light reflection layer 13. In general, the protection layer 14 may be formed by. e.g., forming a coating film of an ultraviolet ray curing (or hardening) resin by use of a spin coating method, and irradiating the resultant coating layer with ultraviolet ray to harden the coating film. In addition, the protection layer 14 may also be formed by use of a resin such as epoxy resin, acrylic resin, silicone resin, and urethane resin. In general, thus formed protection layer 14 may preferably have a thickness of about 0.1 to 100 μm.

It is also possible to dispose an intermediate layer between the above substrate 11 and the light absorbing layer 12. Such an intermediate layer may have a function of protecting the substrate 11 from a solvent. It is also possible to dispose an intermediate layer between the light absorbing layer 12 and the light reflection layer 13. Such an intermediate layer may have a function of improving the efficiency in light absorption.

In general, the WORM type optical disc according to the present invention is irradiated with a recording light (beam) in the form of a pulse, while the disc is rotated. At this time, a portion of the light absorbing layer is fused and removed, or the resultant decomposition product is diffused into the substrate so that a recording portion is provided. The thus formed recording portion may be detected by detecting a difference in a reading light beam reflected by the disc while the disc is rotated.

In the WORM type optical disc according to the present invention, there is introduced the concept of the RMI value which is defined by the following formula:

$$RMI\ value = (I_l - I_g)/I_o,$$

wherein $I_l$ denotes an electric potential at the land portion, $I_g$ denotes an electric potential at the groove portion and $I_o$ denotes an electric potential at the mirror surface portion. As a result, the TE level in the three-beam method may be observed by use of a value measured by use of one beam. In addition, since the RMI value is not lower than 0.22 in the addition type optical disc according to the present invention, there may be provided the WORM type optical disc having a good playability, i.e., the WORM type optical disc wherein the TE is assuredly provided by use of one beam.

What is claimed is:

1. A write once read many type optical disc, comprising a light transmissive substrate having a tracking groove formed therein, a light absorbing layer disposed on a surface of the substrate on which the tracking groove is formed, and a light reflection layer disposed on the light absorbing layer,
wherein an RMI value defined by the following formula is in the range of 0.22 to 0.50:

$$RMI\ value = (I_l - I_g)/I_o,$$

wherein $I_l$ denotes an electric potential at a land portion, $I_g$ denotes an electric potential at a groove portion, and $I_o$ denotes an electric potential at a mirror surface portion.

2. A write once read many type optical disc according to claim 1, wherein the substrate comprises a material selected from the group consisting of a polycarbonate resin and a polymethylmethacrylate resin.

3. A write once read many type optical disc according to claim 1, wherein the light absorbing layer comprises a recording composition comprising a cyanine coloring matter.

4. A write once read many type optical disc according to claim 1, wherein the light reflection layer comprises a film of a metal selected from the group consisting of Au, Ag, Cu and Al.

5. A write once read many type optical disc according to claim 2, wherein the substrate has a thickness in the range of 1.0 to 1.5 mm.

6. A write once read many type optical disc according to claim 4, herein the light absorbing layer has a thickness in the range of 30 to 900 nm.

7. A write once read many type optical disc according to claim 6, wherein the light reflection layer has a thickness in the range of 0.02 to 2.0 μm.

* * * * *